(12) United States Patent
Okada (10) Patent No.: US 7,068,023 B2
(45) Date of Patent: Jun. 27, 2006

(54) SWITCHING POWER SUPPLY CIRCUIT AND OVERCURRENT PROTECTION METHOD FOR THE SWITCHING POWER SUPPLY CIRCUIT

(75) Inventor: Teruo Okada, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 183 days.

(21) Appl. No.: 10/812,091

(22) Filed: Mar. 30, 2004

(65) Prior Publication Data

US 2004/0227498 A1    Nov. 18, 2004

(30) Foreign Application Priority Data

May 12, 2003 (JP) .............................. 2003-133212
Dec. 17, 2003 (JP) .............................. 2003-419572

(51) Int. Cl.
*G05F 1/40* (2006.01)
(52) U.S. Cl. ..................................................... 323/285
(58) Field of Classification Search ................ 323/282, 323/283, 284, 285
See application file for complete search history.

(56) References Cited

U.S. PATENT DOCUMENTS 5,808,455 A    9/1998    Schwartz et al.

6,738,272 B1 *    5/2004    Yamanaka et al. ............ 363/60

FOREIGN PATENT DOCUMENTS

JP    7-46828    2/1995
JP    11-341791    12/1999

\* cited by examiner

*Primary Examiner*—Adolf Berhane
(74) *Attorney, Agent, or Firm*—Armstrong, Kratz, Quintos, Hanson & Brooks, LLP (57) ABSTRACT

A switching power supply circuit comprises a switching element for controlling the on/off state of an input power supply according to a drive pulse generated on the basis of a clock pulse having a prescribed period. Breakdown of circuit elements due to current superposition is effectively prevented by detecting current flowing through the switching element and flywheel current, and comparing these detected results with a first and second reference value, respectively. An overcurrent detection circuit detects that the current flowing through a transistor for controlling the on/off state of the input power source has reached a first reference value, a flywheel current detection circuit detects flywheel current, an overcurrent protection operation is performed for turning off the transistor based on the detected output of the overcurrent detection circuit, and the transistor is turned on during the overcurrent protection operation at the timing of the clock pulse after the flywheel current detected by the flywheel current detection circuit has reached the second reference value.

8 Claims, 12 Drawing Sheets

PRIOR ART

FIG. 10

PRIOR ART

FIG. 11

PRIOR ART

PRIOR ART

PRIOR ART

SWITCHING POWER SUPPLY CIRCUIT AND OVERCURRENT PROTECTION METHOD FOR THE SWITCHING POWER SUPPLY CIRCUIT

BACKGROUND OF THE INVENTION

1. Field of the Invention

The present invention relates to a switching power supply circuit and an overcurrent protection method for the switching power supply circuit, and particularly relates to a switching power supply circuit and an overcurrent protection method for the switching power supply circuit whereby reliable protection is provided against breakdown of circuit elements and the like due to overcurrent.

2. Description of the Related Art

Figure 9:
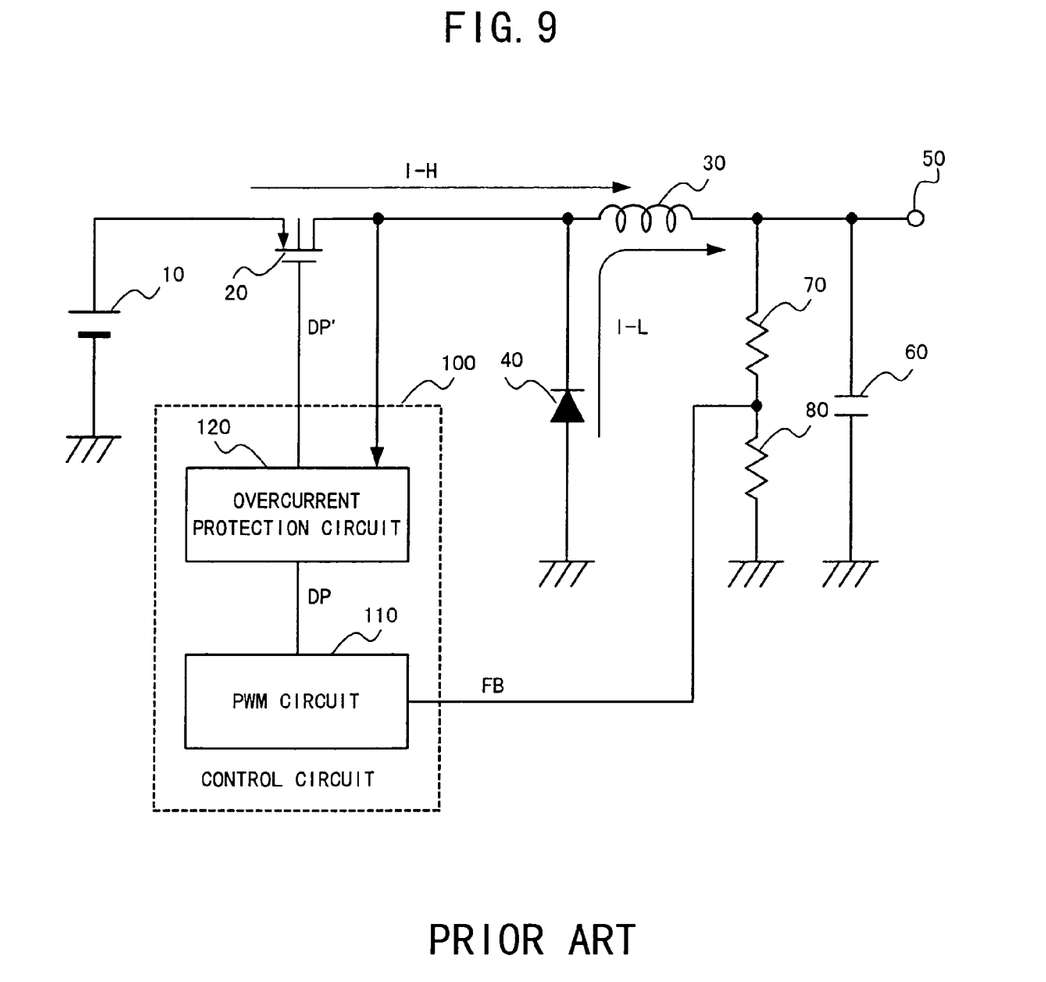
FIG. 9 is a circuit diagram depicting an example of a conventional switching power supply circuit.

FIG. 9 is a circuit diagram depicting an example of a conventional switching power supply circuit. The switching circuit depicted in FIG. 9 constitutes a step-down DC-DC converter. In this switching circuit, a field-effect transistor 20 (hereinafter referred to simply as "transistor") 20 is used as a switching element. A direct current outputted from an input power supply 10 is stepped down by controlling the on/off state of the transistor 20 by means of a drive pulse DP' from a control circuit 100, and the stepped-down current is rectified by a rectifier circuit made up of an inductor 30 and diode 40. This rectified current is outputted from an output terminal 50.

In this conventional switching power supply circuit, a capacitor 60 smoothes the direct current voltage outputted from the output terminal 50, resistors 70 and 80 divide and detect the direct current voltage outputted from the output terminal 50, and the voltage detected by the resistors 70 and 80 is applied to the control circuit 100 as a feedback signal FB.

The control circuit 100 comprises a PWM (Pulse Width Modulation) circuit 110 and an overcurrent protection circuit 120. The PWM circuit 110 generates a drive pulse DP (PWM pulse) in synchronism with a clock pulse CK at a prescribed period for controlling the on/off state of the transistor 20 based on a feedback signal FB.

The overcurrent protection circuit 120 continually monitors the current I-H flowing through the transistor 20. When the current I-H flowing through the transistor 20 exceeds a pre-set prescribed value, the overcurrent protection circuit 120 operates so as to mask the drive pulse DP outputted from the PWM circuit 110 and turn the transistor 20 off.

In FIG. 9, I-L indicates a flywheel current that flows through diode 40 and inductor 30 when the transistor 20 is turned off.

Figure 10:
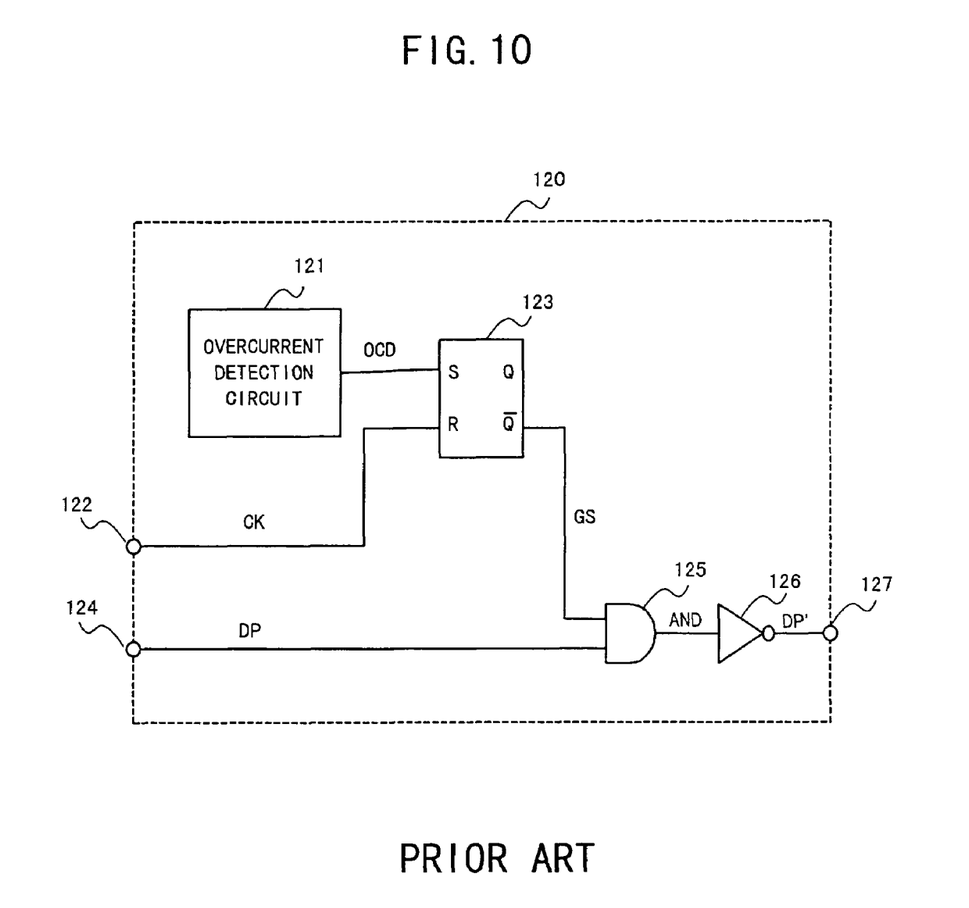
FIG. 10 is a circuit diagram depicting an example of the overcurrent protection circuit of the switching power supply circuit depicted in FIG. 9.
Figure 11:
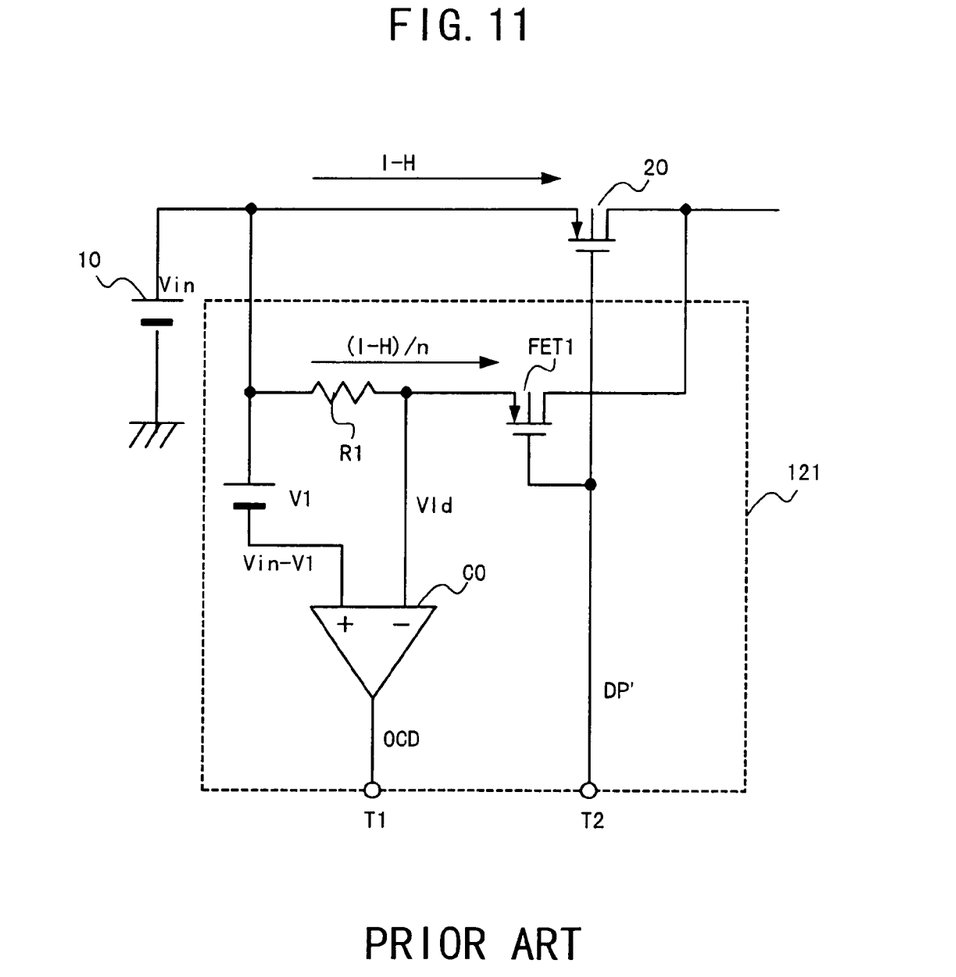
FIG. 11 is a circuit diagram depicting an example of the overcurrent protection circuit depicted in FIG. 10.

FIG. 10 is a circuit diagram depicting an example of the overcurrent protection circuit 120 of the switching power supply circuit depicted in FIG. 9; FIG. 11 is a circuit diagram depicting an example of the overcurrent detection circuit 121 depicted in FIG. 10; and FIG. 12 is a timing chart depicting the operation of the circuits depicted in FIGS. 9 through 11.

In FIG. 11, the current I-H flowing through the transistor 20 is detected by the circuit that includes the resistor R1 and transistor FET1.

In FIG. 11, the transistor 20 and transistor FET1 constitute a current mirror circuit. From the terminal T2, the drive pulse DP' for controlling the on/off state of the transistor 20 is applied to the gates of both the transistor 20 and the transistor FET1, and a current (I-H)/n, which is the 1/nth of the current I-H flowing through the transistor 20, flows into the resistor R1.

Consequently, a detected voltage VId that corresponds to the current I-H flowing through the transistor 20 can be obtained from the junction of the resistor R1 with the transistor FET1.

Figure 12A:
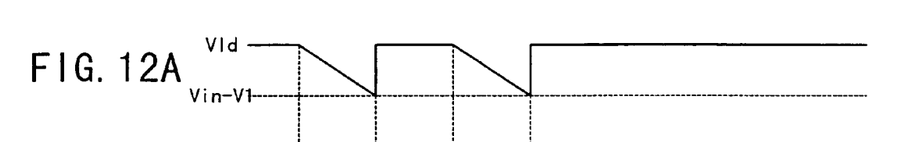

This detected voltage VId is applied to a comparator CO, and with the aid of the comparator CO, the detected voltage VId is compared with the voltage (Vin−V1) obtained by subtracting from the voltage Vin of the input power supply 10 a prescribed reference voltage V1 for detecting overcurrent (see FIG. 12A).

Figure 12B:
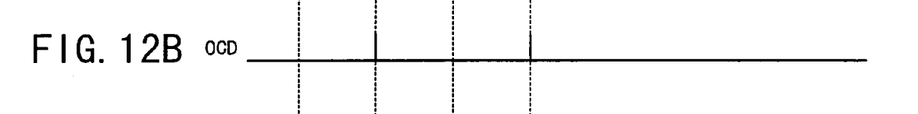

When the detected voltage VId becomes smaller than the voltage (Vin−V1), specifically, when the current I-H flowing through the transistor 20 increases above a prescribed value, an overcurrent detection signal OCD is outputted from the comparator CO (see FIG. 12B).

This overcurrent detection signal OCD is usually low-level, as depicted in FIG. 12B. However, it becomes high-level when the current I-H flowing through the transistor 20 exceeds a prescribed value.

The overcurrent detection signal OCD outputted from the overcurrent detection circuit 121 is outputted from the terminal T1 depicted in FIG. 11 and applied to the set terminal S of the flip-flop 123 depicted in FIG. 10.

Figures 12C, 12D:
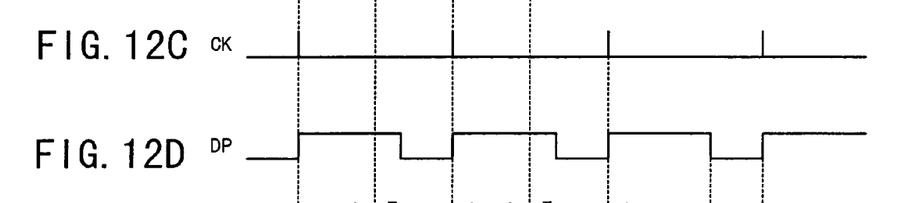
Figure 12E:
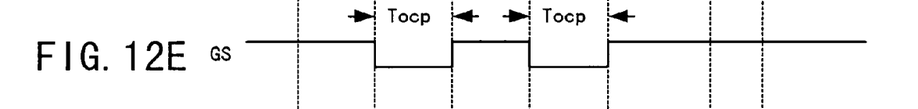

The clock signal CK from the terminal 122 used by the PWM circuit 110 is applied to the reset terminal R of the flip-flop 123, which goes to "high-level" when the overcurrent detection signal OCD from the inverted output terminal thereof is "low-level," and generates a low-level gate signal GS when the overcurrent detection signal OCD goes to "high-level" (see FIG. 12E). This gate signal GS is applied to an AND circuit 125.

Figure 12F:
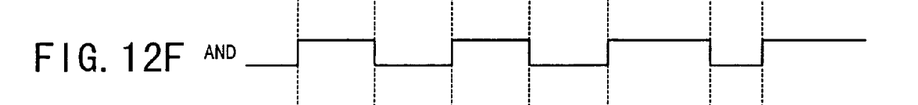

A drive pulse DP (see FIG. 12D) outputted from the PWM circuit 110 is applied from the terminal 124 to the other input terminal in the AND circuit 125. As a result, when the overcurrent detection signal OCD is brought to a "high-level", the AND circuit 125 masks the drive pulse DP outputted from the PWM circuit 110. In other words, the AND circuit 125 prohibits outputting of the drive pulse DP from the PWM circuit 110 (see FIG. 12F).

Figure 12G:
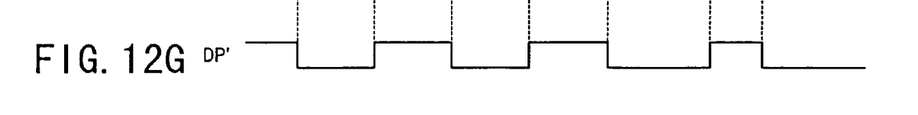

The output of the AND circuit 125 is inverted by an inverter 126 and is outputted from a terminal 127 as a drive pulse DP' for controlling the on/off state of the transistor 20 (see FIG. 12G).

Also, the time period Tocp depicted in FIG. 12E consists of the operating period of the overcurrent protection circuit 120.

Also, in the above-mentioned circuit example, because a P channel MOS is used as the transistor 20, the transistor 20 is turned on when the drive pulse DP' is "low-level."

The above-mentioned overcurrent protection circuit 120 also has such problems as are depicted in FIG. 13.

Specifically, the minimum duty in the drive pulse DP' for controlling the on/off state of the transistor 20 is determined from the performance limit of the circuit. Therefore, as depicted in FIG. 13E, the minimum value of the on-duty time wherein the drive pulse DP' can be maintained at low-level is restricted to Tmin.

Figure 13A:
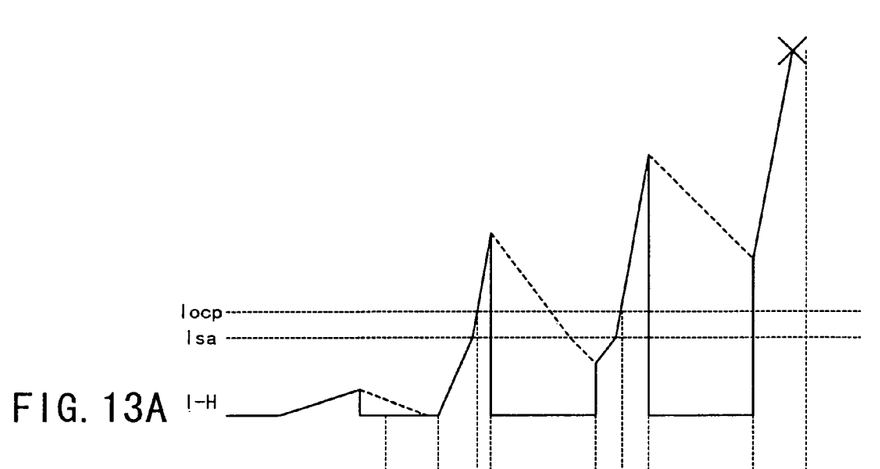
Figure 13B:
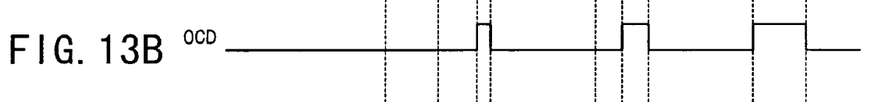
Figure 13C:
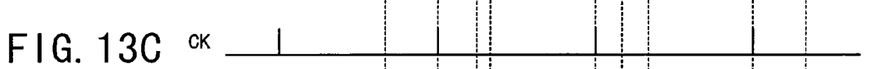
Figure 13D:
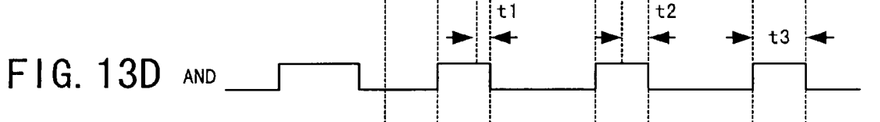
Figure 13E:
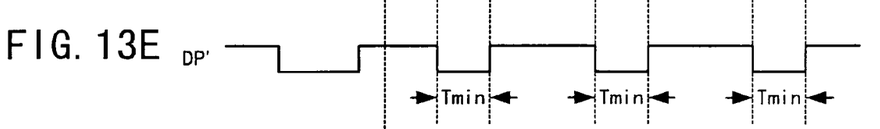
Figure 13F:
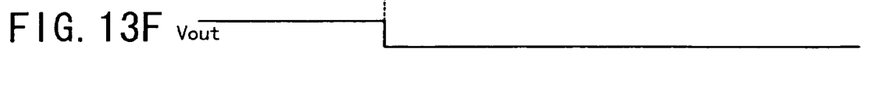

Because of this, as depicted in FIG. 13F, for example, even if the output voltage goes to zero due to load shorting and the like and the current I-H flowing through the transistor 20 exceeds the pre-set prescribed value Vocp (see FIG. 13A), the transistor 20 does not immediately turn off during the minimum duty time Tmin. The current I-H also rises abruptly when the current I-H exceeds the saturation current Isa of the inductor 30.

At the time when the next clock signal CK rises while the overcurrent protection circuit 120 is in operation, if the flywheel current I-L is not sufficiently attenuated as depicted by the dash line in FIG. 13A, current superposition occurs in the inductor 30 (see FIG. 13A). As a result of these facts, the circuit can break down in a worst case.

These facts are likely to occur in such an occasion where the frequency of the clock signal CK is set high, i.e., at a few MHz and the load is extremely large.

Techniques for overcoming the problems caused by the above-mentioned current superposition have been disclosed in Japanese Patent Application Publication Nos. 07-46828 and 11-341791, and in U.S. Pat. No. 5,808,455.

To prevent operating lag in the overcurrent protection circuit in cases in which the switching frequency is high, the switching power supply circuit disclosed in Japanese Patent Application Publication No. 07-46828 is configured so as to minimize the effects of lag time between the time an overcurrent state is detected and the time the transistor turns off, by lowering the switching frequency when the output voltage falls to a prescribed level.

The switching power supply circuit disclosed in Japanese Patent Application Publication No. 11-341791 is configured to perform control so as to lower the detection level of the overcurrent when the output voltage further declines due to a short-circuit or the like, in addition to having the configuration of the switching power supply circuit disclosed in Japanese Patent Application Publication No. 07-46828.

The switching power supply circuit disclosed in U.S. Pat. No. 5,808,455 focuses on the problems of the conventional configuration depicted in FIG. 1 of the same reference, specifically, the problem of power dissipation in a conventional configuration in which a current detecting resistor R is connected in series with an inductor L, and provides a configuration whereby overcurrent can be detected while minimizing power dissipation by disposing a current detection resistor R on the low side as depicted in FIG. 2 of the same reference. As depicted in FIG. 3 of the same reference, this technique is furthermore designed to effectively restrict overcurrent and minimize breakdown in circuit elements by extending the electrical discharge cycle until the inductor current IL reaches I LIMIT 2 after the inductor current IL exceeds a prescribed reference value I LIMIT 1. Also, these two reference values are set and compared using a Schmitt trigger U1.

A configuration whereby a pre-set timer circuit is started upon detection of overcurrent by the overcurrent detection circuit and the drive pulse for controlling the switching on and off of the switching power supply circuit is masked during the timer circuit period has also been considered as another technique for overcoming the problems of the above-mentioned current superposition.

The above-mentioned current superposition can also be prevented and circuit damage due to overcurrent can be prevented in this configuration if the timer circuit period is set sufficiently long.

However, both of the switching power supply circuits disclosed in the above-mentioned Japanese Patent Application Laid-open Nos. H7-46828 and H11-341791 have the problem of reduced responsiveness, because they reduce the switching frequency when overcurrent is detected, and a configuration that uses a timer circuit has problems whereby the timing period of the timer circuit is difficult to set, and the switching cycle of the switching power supply circuit is effectively lengthened, yielding inadequate performance if the set timing period is too long.

Also, in a configuration that uses a timer circuit, the user does not usually know the saturation current value of the inductor of the switching power supply circuit being used.

Therefore, the above-mentioned timing period of the timer circuit must actually be set quite long to allow a margin, in which case problems such as follows may be encountered.
1) Startup time is lengthened, and
2) Response to sudden load fluctuations is delayed Also, because overcurrent detection is delayed by having the overcurrent detection resistor R disposed on the low side, and because both a positive power supply and negative power supply are needed in order to utilize a Schmitt trigger U1 provided with two reference values in a configuration in which the overcurrent detection resistor R is disposed on the low side, the switching power supply circuit disclosed in U.S. Pat. No. 5,808,455 has many aspects that demand improvement in order to obtain a simple circuit structure.

SUMMARY OF THE INVENTION

Therefore, an object of the present invention is to provide a switching power supply circuit and overcurrent protection method for the switching power supply circuit that has rapid startup time and excellent response to sudden load fluctuations, and that is capable of reliably protecting against a breakdown due to overcurrent in circuit elements and the like with a simple structure.

To achieve the above objects, the present invention provides a switching power supply circuit having a switching element for controlling on/off state of an input power supply according to a drive pulse generated on the basis of a clock pulse having a prescribed period, wherein an electric current is allowed to flow from the input power supply to a load by controlling the switching element to be in on state, and a flywheel current is allowed to flow to the load by controlling the switching element to be in off state, in which the switching power supply circuit comprises overcurrent detecting means for detecting that the current flowing through the switching element has reached a first reference value; flywheel current detecting means for detecting that the flywheel current has reached a second reference value; and an overcurrent protection circuit for performing an overcurrent protection operation of turning the switching element off based on a detected output of the overcurrent detecting means, and for turning the switching element on during the overcurrent protection operation at a timing of the clock pulse after the flywheel current detected by the flywheel current detecting means has reached the second reference value.

With the above configuration, the flywheel current detecting means may detect the flywheel current based on an output of a current detection resistor provided in a flywheel current path.

The flywheel current detecting means may comprise a second switching element provided in the flywheel current path and being turned on and off in synchronism with the first-mentioned switching element, and detects the flywheel current using a resistance of the second switching element in on state.

The flywheel current detecting means may further comprise a third switching element provided in the flywheel current path and constitutes a current mirror together with the second switching element that is turned on and off in synchronism with the first-mentioned switching element, whereby the flywheel current detecting mean detects the flywheel current based on the current flowing through the third switching element.

The second reference value may be set to a value of zero or above.

Further, a switching power supply circuit according to another aspect of the present invention comprises a switching element provided with a source terminal, a drain terminal and a gate terminal; a power supply source connected to the source terminal; a load connected to the drain terminal; a control circuit connected to the gate terminal; an inductor disposed in a current path from the drain terminal to the load; a first current detection resistor disposed in a current path from the source terminal to the load; a first comparator connected to the first current detection resistor; a second current detection resistor disposed in a current path from the drain terminal to the ground terminal; and a second comparator connected to the second current detection resistor.

With this configuration, the second comparator may use a ground potential or positive potential as a reference.

Further, still another aspect of the present invention provides an overcurrent protection method for a switching power supply circuit having a switching element for controlling on/off state of an input power supply according to a drive pulse generated on the basis of a clock pulse having a prescribed period, wherein an electric current is allowed to flow from the input power supply to a load by controlling the switching element to be in on state, and a flywheel current is allowed to flow to the load by controlling the switching element to be in off state, in which the overcurrent protection method comprises detecting that the current flowing through the switching element has reached a first reference value; detecting with an overcurrent detecting means that the current flowing through the switching element has reached a first reference value; detecting with flywheel current detecting means that the flywheel current has reached a second reference value; performing an overcurrent protection operation for turning off the switching element based on a detected output of the overcurrent detecting means; and turning on the switching element during the overcurrent protection operation at a timing of the clock pulse after the flywheel current detected by the flywheel current detecting means has reached the second reference value.

In accordance with the present invention, a switching power supply circuit that has rapid startup time and excellent response to sudden load fluctuations, and that is capable of reliably protecting against breakdown due to overcurrent in circuit elements and the like with a simple structure can be provided, as can an overcurrent protection method for the switching power supply circuit, by adopting a configuration in which a switching power supply circuit has a switching element for controlling the on/off state of an input power supply according to a drive pulse generated on the basis of a clock pulse having a prescribed period, for allowing electric current to flow from the input power supply to a load by the on-control to the switching element, and allowing flywheel current to flow to the load by the off-control to the switching element; wherein the switching power supply circuit is equipped with overcurrent detecting means for detecting that the current flowing through the switching element has reached a first reference value; flywheel current detecting means for detecting that the flywheel current has reached a second reference value; and an overcurrent protection circuit for performing an overcurrent protection operation whereby the switching element is turned off based on the detected output of the overcurrent detecting means, and for turning the switching element on during the overcurrent protection operation at the timing of the clock pulse after the flywheel current detected by the flywheel current detecting means has reached the second reference value.

BRIEF DESCRIPTION OF THE DRAWINGS

In the accompanying drawings:

FIGS. 3A through 3j are timing charts describing the overcurrent protection operation of the switching power supply circuit depicted in FIGS. 1 and 2;

FIGS. 12A through 12G are timing charts depicting the operation of the circuits depicted in FIGS. 9 through 11; and FIGS. 13A through 13F are timing charts describing the problems of the conventional overcurrent protection circuit.

DESCRIPTION OF THE PREFERRED EMBODIMENTS

A detailed description of the switching power supply circuit and the overcurrent protection method for the switching power supply circuit according to the present invention will be given with reference to the accompanying drawings.

Figure 1:
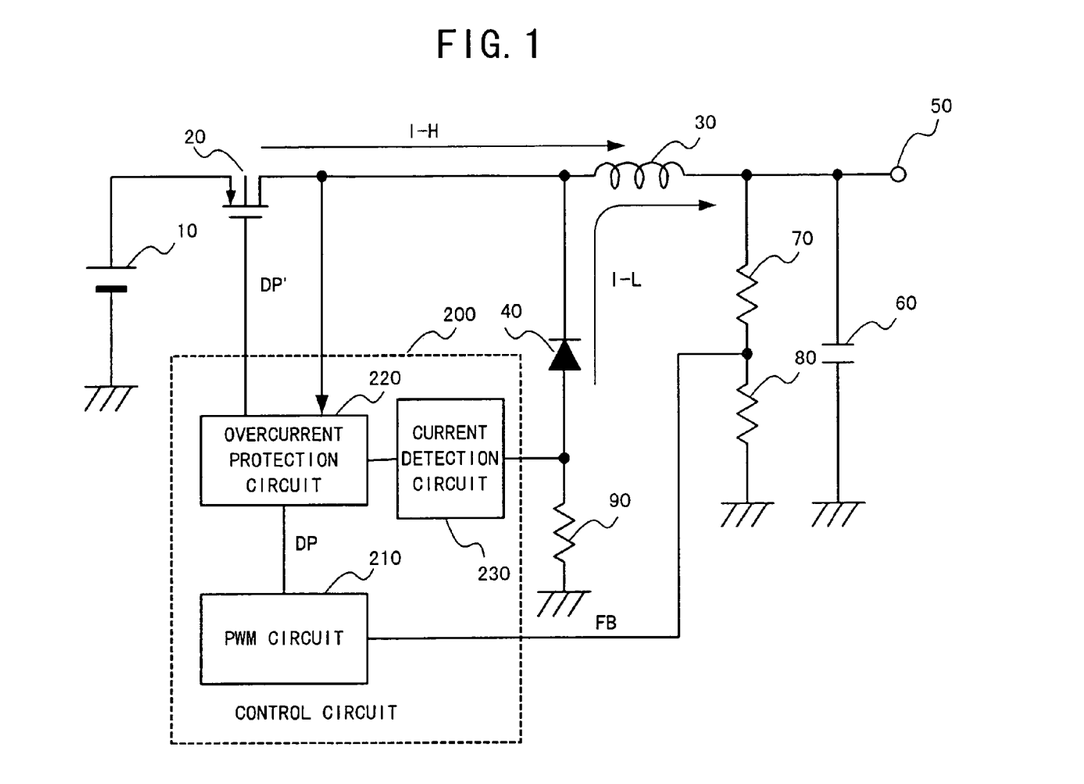
FIG. 1 is a circuit diagram schematically depicting the structure of a switching power supply circuit according to the switching power supply circuit and overcurrent protection method for the switching power supply circuit according to the present invention.

FIG. 1 is a circuit diagram schematically depicting the structure of a switching power supply circuit according to the switching power supply circuit and overcurrent protection method for the switching power supply circuit according to the present invention In FIG. 1, the same symbols are used as are used in FIG. 9 for convenience in describing components that fulfill the same functions as in the conventional circuit depicted in FIG. 9.

In FIG. 1, the switching power supply circuit constitutes a step-down DC-DC converter the same as the conventional switching power supply circuit depicted in FIG. 9. In this switching power supply circuit, a transistor (field-effect transistor) 20 acts as a switching element, and an input power supply 10 such as a battery acts as a power supply source for the DC-DC converter. A direct current outputted from the input power supply 10 is stepped down by controlling the on/off state of the transistor 20 according to a drive pulse DP' from a control circuit 200, the stepped-down direct current is then rectified by a rectifier circuit made up of an inductor 30 and a diode 40, and the rectified current is outputted from an output terminal 50 to a load (not shown).

The transistor 20 is provided with a source terminal, a drain terminal and a gate terminal. The input power supply 10 is connected to the source terminal, a load (not shown) is connected to the drain terminal via the inductor 30, and the control circuit 200 is connected to the gate terminal.

The inductor 30 is an element that stores an electric current supplied from the input power supply 10 as magnetic field energy when the transistor 20 is turned on, and discharges the stored magnetic field energy as an electric current when the transistor 20 is turned off. The inductor 30 is disposed in the current path between the drain terminal of the transistor 20 and the load.

The capacitor 60 is designed for smoothing the direct current voltage outputted from the output terminal 50, and the resistors 70 and 80 are designed for dividing and detecting the direct current voltage outputted from the output terminal 50. The voltage detected by the resistors 70 and 80 is applied to the control circuit 200 as a feedback signal FB.

The resistor 90 is a current detection resistor for detecting a flywheel current I-L flowing via the diode 40 and inductor 30 when the transistor 20 is turned off, and is disposed in the current path between the drain terminal of the transistor 20 and the ground terminal mounted on the converter.

The control circuit 200 comprises a PWM (Pulse Width Modulation) circuit 210, an overcurrent protection circuit 220, and a current detection circuit 230.

The PWM circuit 210 generates a drive pulse DP (PWM pulse) in synchronism with a clock pulse CK with a prescribed period. The drive pulse DP controls the on/off state of the transistor 20 based on a feedback signal FB.

The current detection circuit 230 uses a voltage drop across the resistor 90 to detect the flywheel current I-L flowing via the diode 40 and inductor 30.

The overcurrent protection circuit 220 constantly monitors the current I-H flowing through the transistor 20, performs an overcurrent protection operation for masking the drive pulse DP outputted from the PWM circuit 210 when the current I-H flowing through the transistor 20 exceeds a pre-set prescribed value, and performs control during the overcurrent protection operation, for canceling the ON state of the transistor 20 until the flywheel current I-L detected by the current detection circuit 230 is brought to substantially zero.

Figure 2:
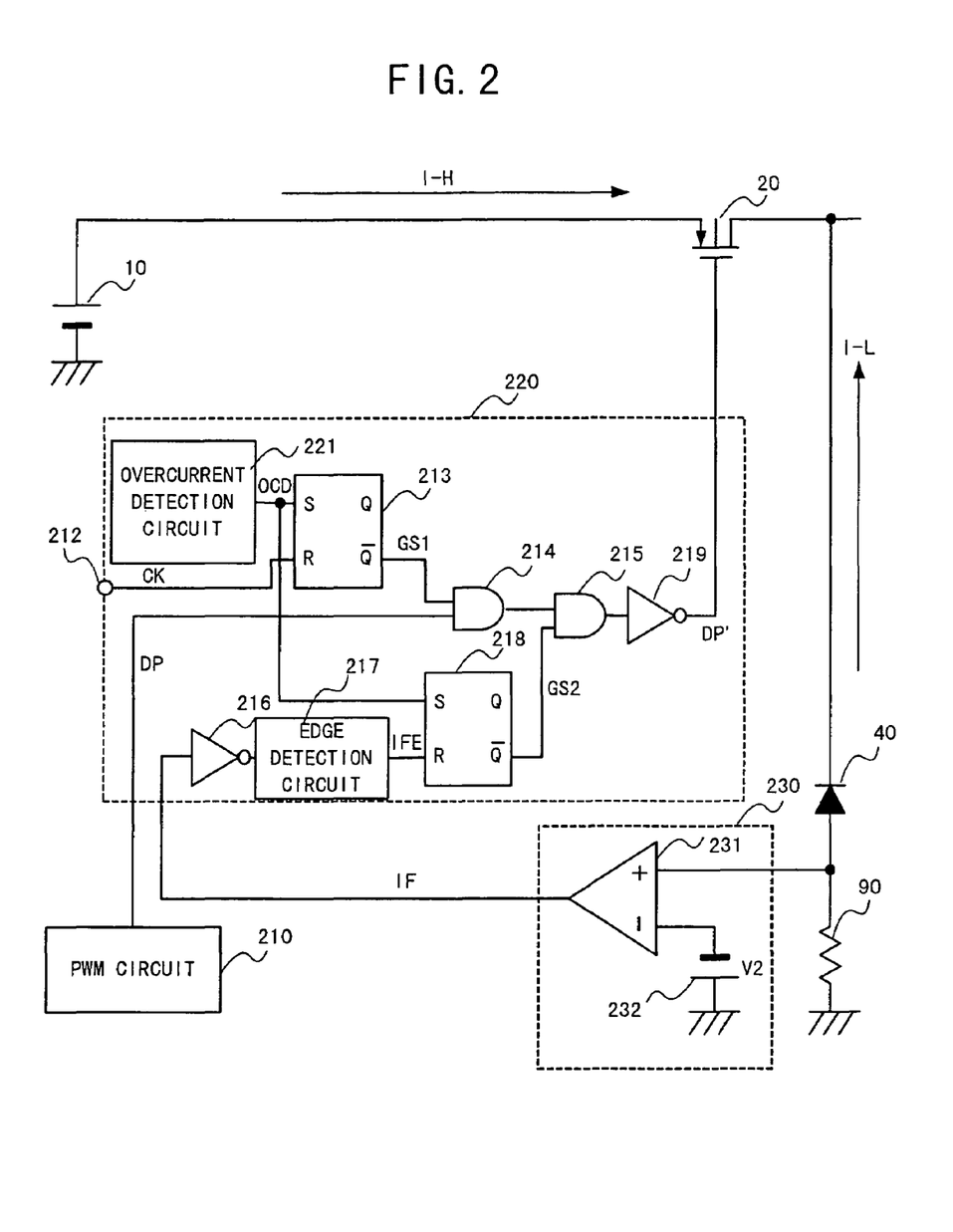
FIG. 2 is a circuit diagram depicting the detailed structure of the overcurrent protection circuit and current detection circuit of the control circuit depicted in FIG. 1.

FIG. 2 is a circuit diagram depicting the detailed structure of the overcurrent protection circuit 220 and current detection circuit 230 of the control circuit 200 depicted in FIG. 1.

In FIG. 2, the overcurrent protection circuit 220 comprises an overcurrent detection circuit 221 for constantly monitoring the current I-H flowing through the transistor 20 and outputting an overcurrent detection signal OCD when the current I-H flowing through the transistor 20 reaches a pre-set first reference value; a flip-flop 213 in which the overcurrent detection signal OCD outputted from the overcurrent detection circuit 221 is applied to a set terminal S thereof and the clock signal CK from the terminal 212 is applied to a reset terminal R thereof, an AND circuit 214 to which the drive pulse DP (PWM pulse) outputted from the PWM circuit 210 and the inverted output GS1 of the flip-flop 213 are applied; an inverter 216 for reversing the flywheel current detection signal IF outputted from the current detection circuit 230; an edge detection circuit 217 for detecting the rising edge of the signal outputted from the inverter 216; a flip-flop 218 in which the overcurrent detection signal OCD outputted from the overcurrent detection circuit 221 is applied to the set terminal S thereof, and the output of the edge detection circuit 217 is applied to the reset terminal R thereof, an AND circuit 215 to which the output of the AND circuit 214 and the inverted output GS2 of the flip-flop 218 are applied; and an inverter 219 for inverting the output of the AND circuit 215 and applying it to the gate of the transistor 20 as a drive pulse DP'.

The overcurrent detection circuit 221 may preferably be configured as depicted in FIG. 11 so that a current mirror is constituted with the transistor 20 and transistor FET1, and a current detection resistor is mounted in the branch in which the transistor FET1 is disposed so as to realize a minimal power dissipation. However, a configuration for detecting the current I-H may also be adopted wherein a resistor for current detection is disposed in the current path from the source terminal of the transistor 20 to the load.

The current detection circuit 230 comprises an operational amplifier 231 in which the junction of the diode 40 with the resistor 90 is connected to the positive terminal, and the power supply 232 for generating a reference voltage V2 (second reference value) for detecting the flywheel current I-L is connected to the negative terminal.

An arrangement may be such that the PWM circuit 210 has the same structure as the PWM circuit 110 depicted in FIG. 9, and the overcurrent detection circuit 221 has the same structure as the overcurrent detection circuit 121 depicted in FIG. 11.

In the circuit depicted in FIG. 2, the current detection circuit 230 detects the flywheel current I-L flowing via the diode 40 and inductor 30 by means of the operational amplifier 231 when the transistor 20 is turned off.

Specifically, an electric potential that corresponds to a voltage drop across the resistor 90 by the flywheel current I-L is inputted to the positive terminal of the operational amplifier 231 and an electric potential (GND–V2), in which a reference voltage V2 is subtracted from the ground potential, is inputted to the negative terminal thereof. Therefore, a high-level flywheel current detection signal IF is outputted from the operational amplifier 231 when the voltage drop across the resistor 90 by the flywheel current I-L becomes greater than the reference voltage V2.

If the reference voltage V2 is made to be zero, a high-level flywheel current detection signal IF is outputted from the time the flywheel current I-L is generated until the time it decreases to zero. If the reference voltage V2 is a constant value, a high-level flywheel current detection signal IF is outputted from the time when the flywheel current I-L is equal to or above a current that corresponds to the constant value until the time it decreases to a current corresponding to the constant value.

The flywheel current detection signal IF is inverted by the inverter 216 of the overcurrent protection circuit 220, the rising edge thereof is detected by the edge detection circuit 217, and an edge detection pulse IFE is outputted from the edge detection circuit 217 at the detected timing. The edge detection pulse IFE is applied to the reset terminal R of the flip-flop 218.

Specifically, the overcurrent detection signal OCD outputted from the overcurrent detection circuit 221 is applied to the set terminal S of the flip-flop 218, and the edge detection pulse IFE is applied to the reset terminal R thereof, so the flip-flop 218 is set at the timing at which overcurrent in the current I-H flowing through the transistor 20 is detected by the overcurrent detection circuit 221, and is reset at the timing at which the flywheel current detection signal IF is decreased to a value corresponding to the reference voltage V2.

Also, the overcurrent detection signal OCD outputted from the overcurrent detection-circuit 221 is applied to the set terminal S of the flip-flop 213, and the clock pulse CK is applied to the reset terminal R thereof, so that the flip-flop 213 is set at the timing at which overcurrent in the current I-H flowing through the transistor 20 is detected by the overcurrent detection circuit 221, and is reset at the clock pulse CK, specifically, at the timing at which the next drive pulse DP rises from the PWM circuit 210.

The drive pulse DP outputted from the PWM circuit 210 is then blocked while the flip-flop 213 is set by the AND circuit 214, and is furthermore blocked while the flip-flop 218 is set by the AND circuit 215. As a result, outputting of the drive pulse DP outputted from the PWM circuit 210 is blocked from the timing at which overcurrent is detected by the overcurrent detection circuit 221 until the timing at which the flywheel current detection signal IF falls to a value corresponding to the reference voltage V2.

Consequently, the transistor 20 is not turned on from the timing at which overcurrent is detected by the overcurrent detection circuit 221 until the timing at which the next clock pulse CK rises after the timing at which the flywheel current detection signal IF falls to a value corresponding to the reference voltage V2.

FIG. 3 is a timing chart describing the overcurrent protection operation of the switching power supply circuit depicted in FIGS. 1 and 2.

Figure 3A:
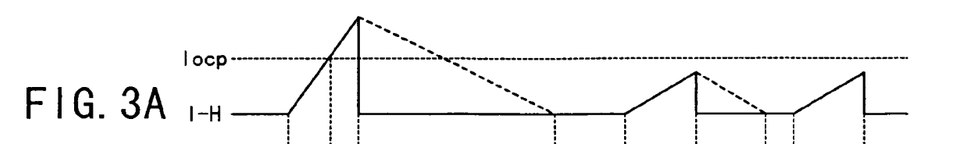
Figure 3B:
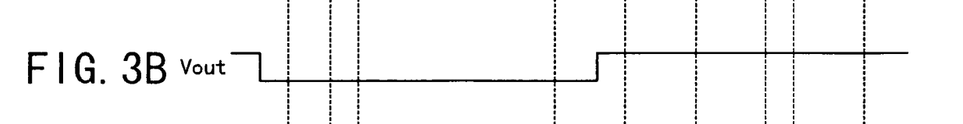
Figure 3C:
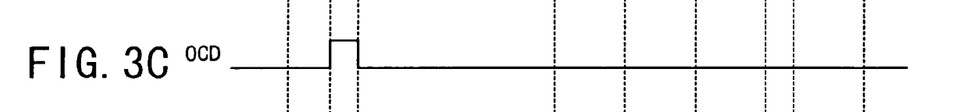
Figure 3D:
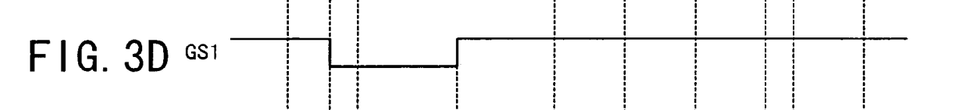
Figure 3E:
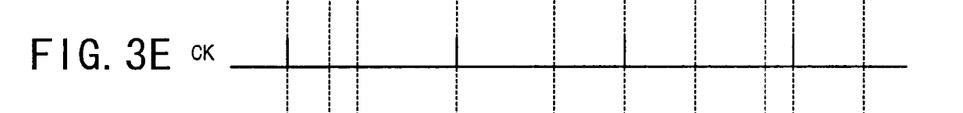
Figure 3F:
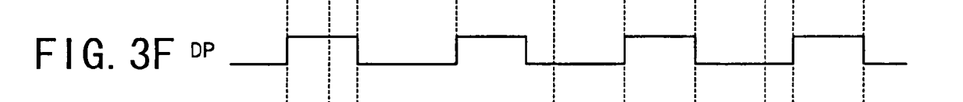

In the switching power supply circuit depicted in FIGS. 1 and 2, if shorting occurs in the load and the output voltage Vout goes to zero as depicted in FIG. 3B, the current I-H flowing through the transistor 20 gradually increases from the timing at which the drive pulse DP outputted from the PWM circuit 210 rises as depicted in FIG. 3F, and exceeds the overcurrent detection value Iocp of the overcurrent detection circuit 221 as depicted in FIG. 3A.

A high-level overcurrent detection signal OCD is outputted from the overcurrent detection circuit 221 while the current I-H flowing through the transistor 20 exceeds over the overcurrent detection value Iocp (FIG. 3C). Since the overcurrent detection signal OCD is outputted at the time when the current I-H reaches the overcurrent detection value Iocp, early detection of overcurrent is effectively performed.

The flywheel current I-L then flows via the diode 40 when the transistor 20 is turned off, as indicated by the dash line in FIG. 3A.

Figure 3G:
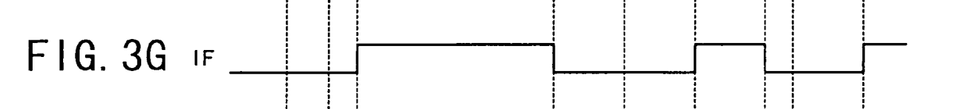

The flywheel current I-L is detected by the overcurrent detection circuit 230, and as depicted in FIG. 3G, a high-level flywheel current detection signal IF is generated from the current detection circuit 230 from the time the flywheel current is generated until the time it decreases to zero. Incidentally, FIG. 3 depicts a case in which the reference voltage V2 is set to zero in the current detection circuit 230 in FIG. 2.

Figure 3H:
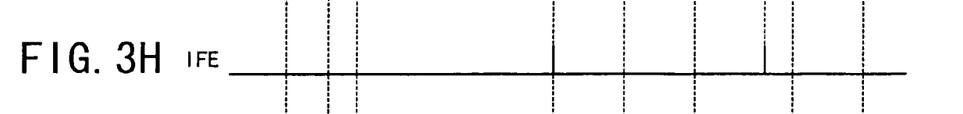

The flywheel current detection signal IF is inverted by the inverter 216 of the overcurrent protection circuit 220. Since the rising of the inverter 216 output is detected by the edge detection circuit 217, an edge detection pulse IFE is outputted from the edge detection circuit 217 at the timing at which the flywheel current I-L decreases to zero, as depicted in FIG. 3H.

Figure 3I:
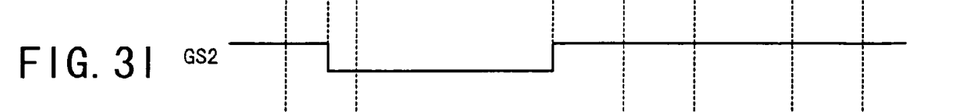

This edge detection pulse IFE is applied to the reset terminal R of the flip-flop 218, and the overcurrent detection signal OCD outputted from the overcurrent detection circuit 221 is applied to the set terminal S of the flip-flop 218. Thus, a low-level gate signal GS2 is outputted from the inverted output terminal of the flip-flop 218 from the time when overcurrent is detected by the overcurrent detection circuit 221 until the time the flywheel current I-L decreases to zero, as depicted in FIG. 3I.

The overcurrent detection signal OCD outputted from the overcurrent detection circuit 221 is applied to the set terminal S of the flip-flop 213, and the clock pulse CK is applied to the reset terminal R thereof Thus, a low-level gate signal GS1 is outputted from the inverted output terminal of the flip-flop 213 from the time when overcurrent is detected by the overcurrent detection circuit 221 until the time the next clock pulse CK rises, as depicted in FIG. 3D.

This gate signal GS1 is applied to the AND circuit 214 in which the drive pulse DP outputted from the PWM circuit 210 is applied to another input terminal (see FIG. 3F), and the above-mentioned gate signal GS2 is applied to the AND circuit 215 in which the output of the AND circuit 214 is applied to another input terminal. Therefore, the drive pulse DP outputted from the PWM circuit 210 is masked from the time when overcurrent is detected by the overcurrent detection circuit 221 until the time the flywheel current I-L decreases to zero.

Figure 3J:
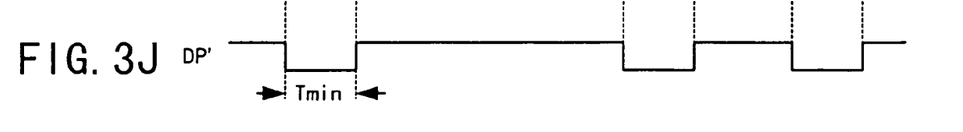

With the above operation, the drive pulse DP' depicted in FIG. 3J is outputted from the inverter 219 for inverting the output of the AND circuit 215, and the transistor 20 is controlled by the drive pulse DP' even if the on-duty time of the drive pulse DP' decreases to the minimum time Tmin as depicted in FIG. 3J. Therefore, an overcurrent does not generated regardless of the saturation current value of the inductor 30 until a breakdown occurs in the circuit elements by current superposition in the inductor 30.

Further, in the switching power supply circuit of the present embodiment, the transistor 20 is turned on after the flywheel current I-L goes to zero or decreases to a value where an overcurrent is not generated until a breakdown occurs in the circuit elements by current superposition. Therefore, startup time can be sufficiently shortened during startup, and responsiveness to sudden load fluctuations is not deteriorated.

Figure 4:
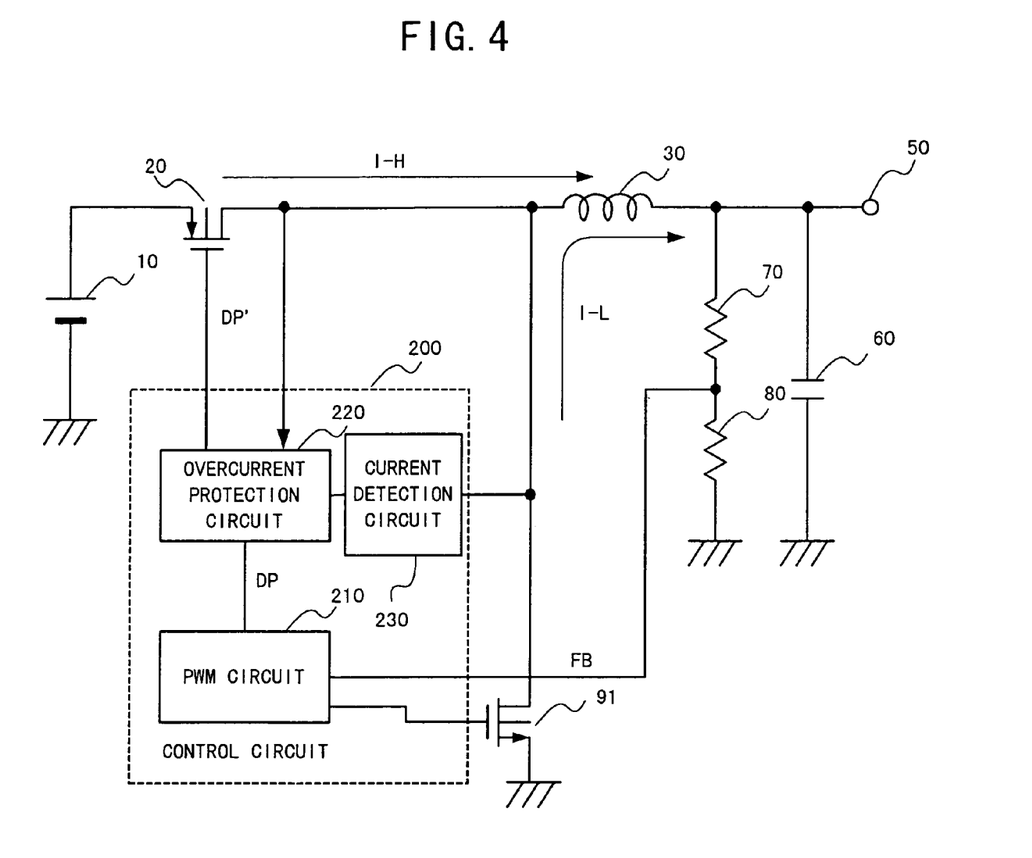
FIG. 4 is a circuit diagram depicting another embodiment of the switching power supply circuit according to the present invention.

FIG. 4 is a circuit diagram depicting another embodiment of the switching power supply circuit according to the present invention.

The depicted in FIG. 4 is a synchronous rectification-type switching power supply circuit in which the diode 40 of the switching power supply circuit depicted in FIG. 1 is substituted with a transistor (field-effect transistor) 91 whose on/off state is controlled by the output of the PWM circuit 210. In the switching power supply circuit of this embodiment, the overcurrent detection circuit of the control circuit 200 detects the flywheel current I-L by using the resistance of the transistor (field-effect transistor) 91 in on state. The configuration other than the above is the same as that of the switching power supply circuit depicted in FIG. 1.

Specifically, the transistor 91 is turned on when the transistor 20 is turned off by the output of the PWM circuit 210. The flywheel current I-L then flows via the transistor 91 that has been turned on, and the overcurrent detection circuit of the control circuit 200 detects this flywheel current I-L using the resistance of the transistor 91 in on state.

Figure 5:
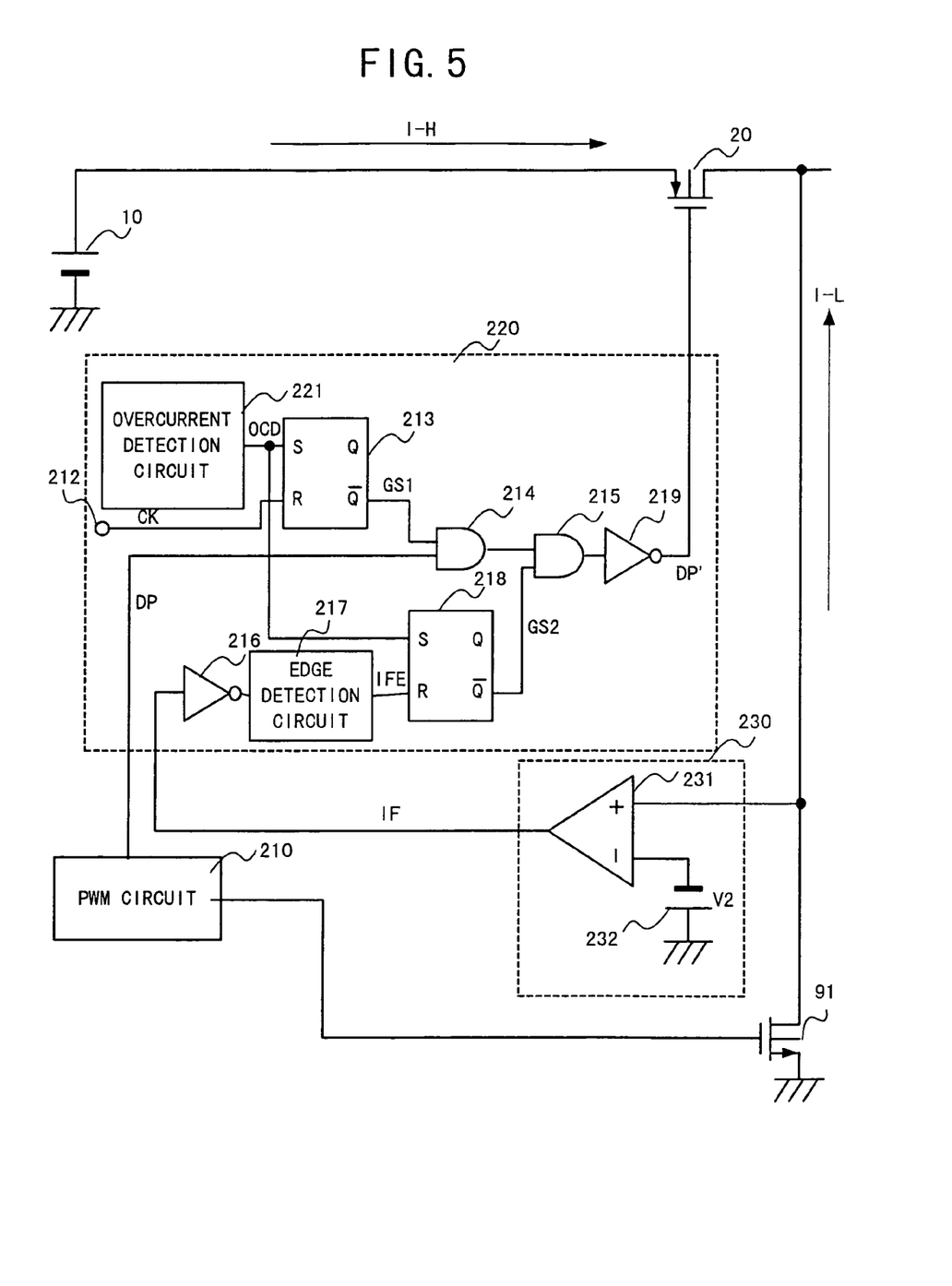
FIG. 5 is a circuit diagram depicting the detailed structure of the overcurrent protection circuit and current detection circuit of the control circuit depicted in FIG. 4.

FIG. 5 is a circuit diagram depicting the detailed structure of the overcurrent protection circuit 220 and current detection circuit 230 of the control circuit 200 depicted in FIG. 4.

The configurations of the overcurrent protection circuit 220 and the current detection circuit 230 are the same as those of the overcurrent protection circuit 220 and current detection circuit 230 depicted in FIG. 2 except that the source of the transistor 91 is connected to the positive terminal of the operational amplifier 231 in the current detection circuit depicted in FIG. 5.

Specifically, in the configuration of this embodiment, an electric potential that corresponds to a voltage drop across the resistance of the transistor 91 in on state caused by the flywheel current I-L is inputted to the positive terminal of the operational amplifier 231, and an electric potential (GND−V2) in which a reference voltage V2 is subtracted from the ground potential is inputted to the negative terminal thereof, a high-level flywheel current detection signal IF is outputted from the operational amplifier 231 when the voltage drop across the on-resistance of the transistor 91 caused by the flywheel current I-L exceeds the electric potential (GND−V2).

Figure 6:
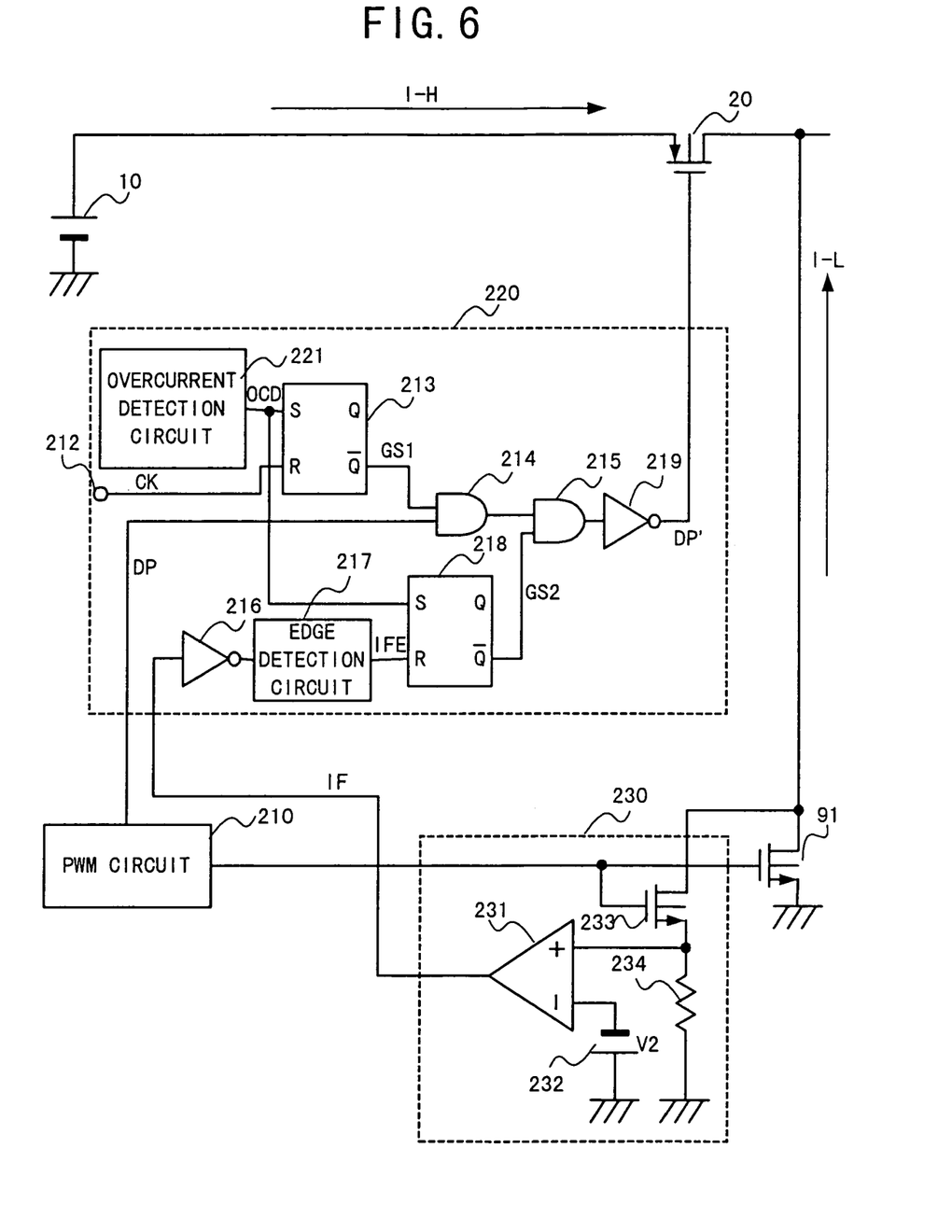
FIG. 6 is a circuit diagram depicting a modification of the current detection circuit depicted in FIG. 5.

FIG. 6 is a circuit diagram depicting a modification of the current detection circuit 230 depicted in FIG. 5.

The current detection circuit depicted in FIG. 5 is configured such that the source of the transistor 91 inputs directly to the positive terminal of the operational amplifier 231 so as to detect the flywheel current I-L. On the other hand, in the current detection circuit 230 depicted in FIG. 6, a transistor (field-effect transistor) 233 is provided that constitutes a current mirror circuit with the transistor 91, a resistor 234 is connected to the drain of the transistor 233, and the flywheel current I-L is detected by using the voltage drop across the resistor 234. Other aspects of the configuration are the same as that depicted in FIG. 5.

Specifically, in the configuration of FIG. 6, the output of the PWM circuit 210 is applied to both the transistor 233 and the transistor 91 together, and a current corresponding to the flywheel current I-L flowing through the transistor 91 flows in the transistor 233.

The current flowing through the transistor 233 is then detected by the voltage drop across the resistor 234 and applied to the positive terminal of the operational amplifier 231. Also, because electric potential (GND−V2) in which a reference voltage V2 is subtracted from the ground potential is inputted to the negative terminal of the operational amplifier 231, a high-level flywheel current detection signal IF is outputted from the operational amplifier 231 when the voltage drop across the resistor 234 caused by the flywheel current I-L exceeds the electric potential (GND−V2).

The same overcurrent protection as in the configurations depicted in FIGS. 1 and 2 can be performed by means of the above-mentioned configurations depicted in FIGS. 4 and 5.

Figure 7:
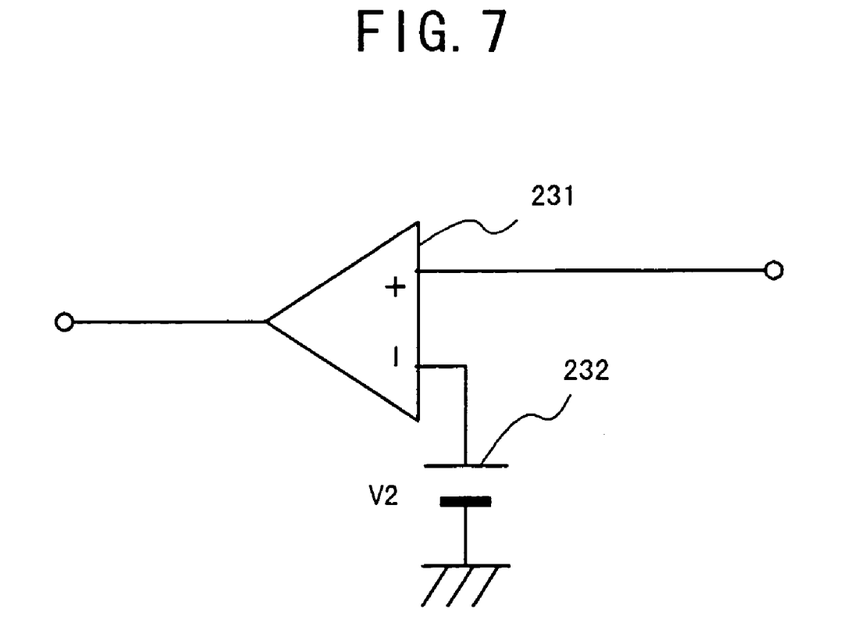
FIG. 7 is a circuit diagram depicting a modification of the current detection circuit 230 depicted in FIG. 2.

Also, a positive potential may be used as the reference voltage V2 (second reference value) by connecting the power supply 232 to the negative terminal of the operational amplifier 231 for the current detection circuit 230, as depicted in FIG. 7. In this case, the configuration can be simplified because the need is eliminated for preparing a separate power supply 232 such as is shown in the current detection circuit 230 of FIG. 2.

Figure 8:
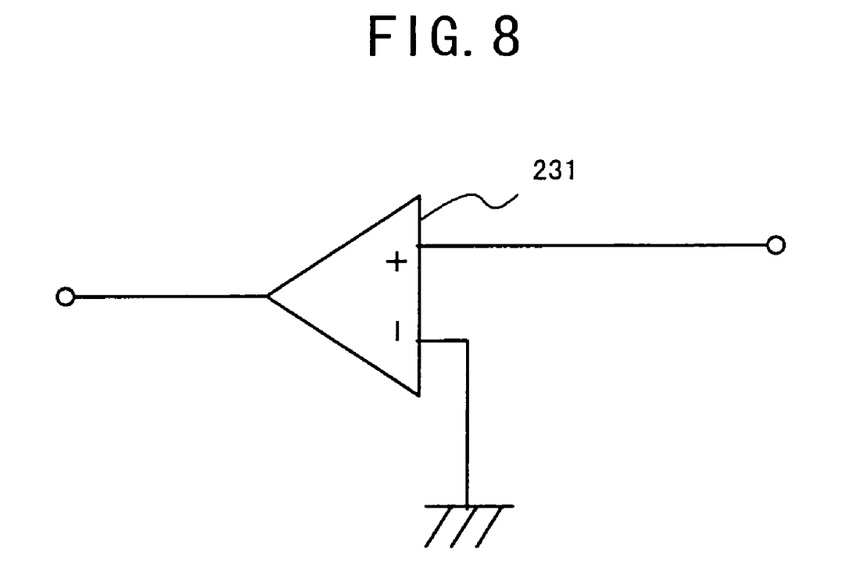
FIG. 8 is a circuit diagram depicting another modification of the current detection circuit 230 depicted in FIG. 2.

Further, as depicted in FIG. 8, the negative terminal of the operational amplifier 231 may be set to the ground potential, and a zero point may be used as the reference voltage V2. The simplest configuration can be achieved in this case because there is no need for both a negative power supply and a positive power supply.

When a positive potential or negative potential is used as the reference voltage V2, the threshold value needed to eliminate current superposition may be set as the electric potential according to the superposition characteristics of the inductor being used. For example, a value may be set that is distant from the zero potential when an inductor is used in which current superposition does not easily occur, and a value may be set that is in the vicinity of the zero potential near a complete discharge when using an inductor in which current superposition occurs easily.

What is claimed is:

1. A switching power supply circuit having a switching element for controlling on/off state of an input power supply according to a drive pulse generated on the basis of a clock pulse having a prescribed period, wherein an electric current is allowed to flow from the input power supply to a load by controlling the switching element to be in on state, and a flywheel current is allowed to flow to the load by controlling the switching element to be in off state; the switching power supply circuit comprising:

overcurrent detecting means for detecting that the current flowing through the switching element has reached a first reference value;

flywheel current detecting means for detecting that the flywheel current has reached a second reference value; and an overcurrent protection circuit for performing an overcurrent protection operation of turning the switching element off based on a detected output of the overcurrent detecting means, and for turning the switching element on during the overcurrent protection operation at a timing of the clock pulse after the flywheel current detected by the flywheel current detecting means has reached the second reference value.

2. The switching power supply circuit according to claim 1, wherein the flywheel current detecting means detects the flywheel current based on an output of a current detection resistor provided in a flywheel current path.

3. The switching power supply circuit according to claim 1, wherein the flywheel current detecting means comprises a second switching element provided in the flywheel current path and being turned on and off in synchronism with the first-mentioned switching element, and detects the flywheel current using a resistance of the second switching element in on state.

4. The switching power supply circuit according to claim 1, wherein the flywheel current detecting means further comprises a third switching element provided in the flywheel current path and constitutes a current mirror together with the second switching element that is turned on and off in synchronism with the first-mentioned switching element, whereby the flywheel current detecting mean detects the flywheel current based on the current flowing through the third switching element.

5. The switching power supply circuit according to claim 1, wherein the second reference value is set to a value of zero or above.

6. A switching power supply circuit comprising:

a switching element provided with a source terminal, a drain terminal and a gate terminal;

a power supply source connected to the source terminal;

a load connected to the drain terminal;

a control circuit connected to the gate terminal;

an inductor disposed in a current path from the drain terminal to the load;

a first current detection resistor for detecting a current flowing from the source terminal to the drain terminal;

a first comparator connected to the first current detection resistor;

a second current detection resistor disposed in a current path from the drain terminal to the ground terminal; and a second comparator connected to the second current detection resistor.

7. The switching power supply circuit according to claim 6, wherein the second comparator uses a ground potential or positive potential as a reference.

8. An overcurrent protection method for a switching power supply circuit having a switching element for controlling on/off state of an input power supply according to a drive pulse generated on the basis of a clock pulse having a prescribed period, wherein an electric current is allowed to flow from the input power supply to a load by controlling the switching element to be in on state, and a flywheel current is allowed to flow to the load by controlling the switching clement to be in off state; the overcurrent protection method comprising:

detecting that the current flowing through the switching element has reached a first reference value;

detecting with an overcurrent detecting means that the current flowing through the switching element has reached a first reference value;

detecting with flywheel current detecting means that the flywheel current has reached a second reference value;

performing an overcurrent protection operation for turning off the switching element based on a detected output of the overcurrent detecting means; and     turning on the switching element during the overcurrent protection operation at a timing of the clock pulse after the flywheel current detected by the flywheel current detecting means has reached the second reference value.

\* \* \* \* \*